United States Patent
Hanamoto et al.

(10) Patent No.: US 7,545,521 B2
(45) Date of Patent: Jun. 9, 2009

(54) IMAGE PROCESSING APPARATUS AND METHOD UTILIZED TO GENERATE COVER IMAGE

(75) Inventors: Takashi Hanamoto, Kanagawa (JP); Masanori Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1496 days.

(21) Appl. No.: 10/136,337

(22) Filed: May 2, 2002

(65) Prior Publication Data
US 2002/0167683 A1  Nov. 14, 2002

(30) Foreign Application Priority Data
May 14, 2001  (JP)  ............................ 2001-143662
Apr. 2, 2002  (JP)  ............................ 2002-100468

(51) Int. Cl.
*G06F 3/12*  (2006.01)
*G06K 15/00*  (2006.01)

(52) U.S. Cl. ...................................... 358/1.1; 358/1.18
(58) Field of Classification Search .......... 358/1.1–1.18
See application file for complete search history.

(56) References Cited

U.S. PATENT DOCUMENTS

| | | | |
|---|---|---|---|
| 6,223,131 B1 * | 4/2001 | Kanaya et al. ................. | 702/55 |
| 6,324,536 B1 * | 11/2001 | Rofrano ......................... | 707/5 |
| 6,336,210 B1 * | 1/2002 | Taima et al. ................. | 717/100 |
| 6,396,963 B2 * | 5/2002 | Shaffer et al. ............... | 382/305 |
| 6,466,940 B1 * | 10/2002 | Mills ........................... | 707/102 |
| 6,873,430 B2 * | 3/2005 | Grasso et al. ............... | 358/1.16 |
| 6,891,637 B1 * | 5/2005 | Asami ........................ | 358/1.18 |
| 6,915,454 B1 * | 7/2005 | Moore et al. .................. | 714/38 |
| 6,952,281 B1 * | 10/2005 | Irons et al. ................. | 358/1.15 |
| 2003/0099526 A1 * | 5/2003 | Saw et al. ..................... | 412/19 |

FOREIGN PATENT DOCUMENTS

JP  2000-32250  1/2000

* cited by examiner

*Primary Examiner*—Douglas Q. Tran
(74) *Attorney, Agent, or Firm*—Fitzpatrick, Cella, Harper & Scinto

(57) ABSTRACT

A complicated operation using a graphics application is necessary in order to create a cover attached to an album. Accordingly, when a cover image to be attached to an output object that includes a digital image is generated, metadata that has been associated with the digital image to be output is read in and the cover image is generating by making selective use of a cover template related to the metadata that has been read in.

11 Claims, 13 Drawing Sheets

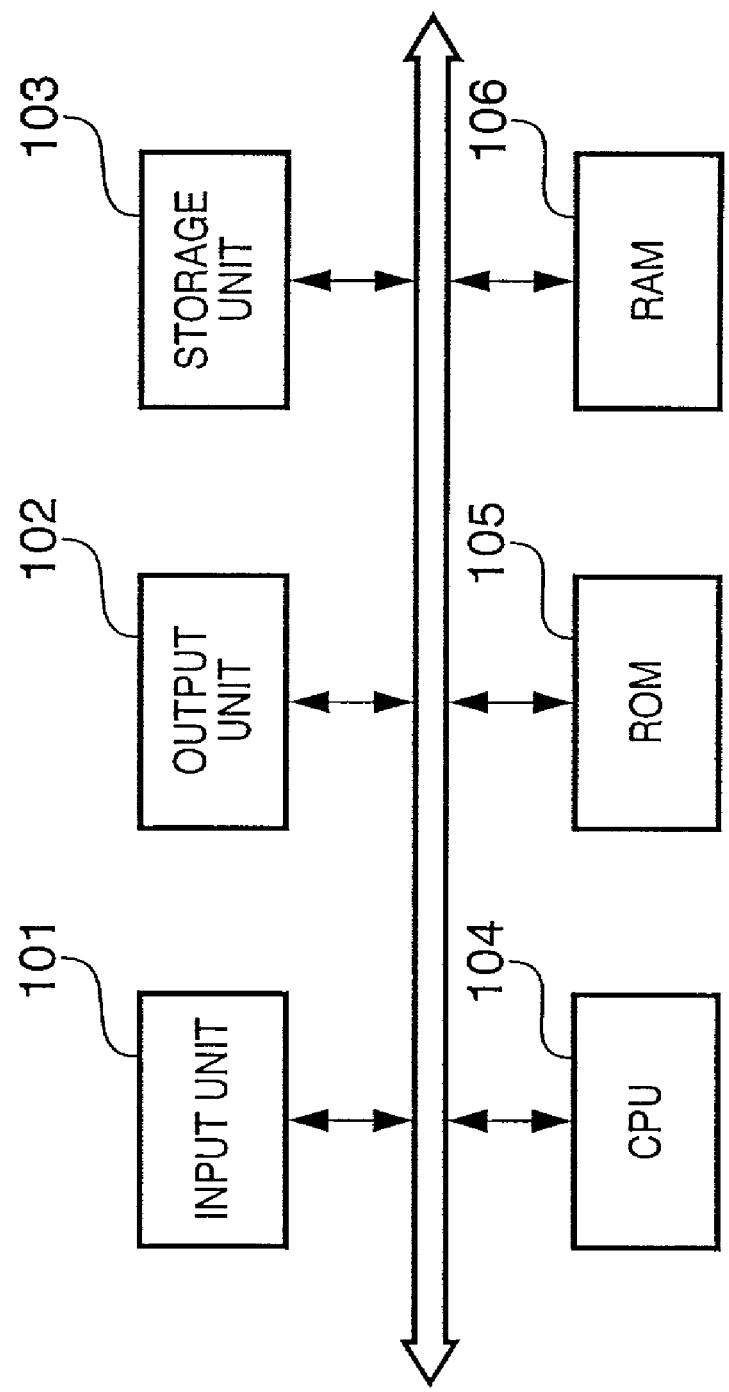

202 PRINTED IMAGES

COVER 204

FIG. 8
501 METADATA
```
<?xml version="1.0" encoding="Shift_JIS"?>
<PHOTO>
    <ITEM ATTR="Photographer">HANAMOTO</ITEM>
    <ITEM ATTR="Date">2001-1-1</ITEM>
    <ITEM ATTR="Location">○×神社</ITEM>
    <ITEM ATTR="Event">初詣</ITEM>
</PHOTO>
```
初詣
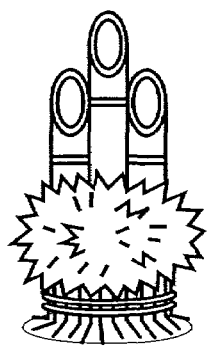
2001年1月1日
○×神社
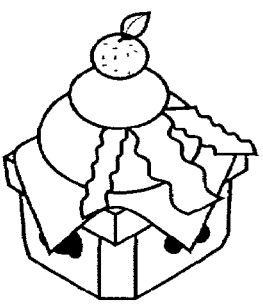
PHOTOGRAPHER : HANAMOTO
204

IMAGE PROCESSING APPARATUS AND METHOD UTILIZED TO GENERATE COVER IMAGE

FIELD OF THE INVENTION

This invention relates to an image processing apparatus and method. More particularly, the invention relates to image processing for generating a cover image to be attached to an output object that includes a digital image.

BACKGROUND OF THE INVENTION

Prints that are the result of printing images, which have been captured by a digital camera or the like, usually are referred to collectively as an album. In order to organize such prints, often the album is kept with a cover or the like attached thereto.

On the other hand, metadata, which means "data relating to data", is used as data that describes binary data such as image data or voice data.

Though albums usually have covers attached thereto, occasions on which a cover is attached to an actually printed album are few. The reason for this is that a troublesome operation using a graphics application is required in order to create a cover to be attached to an album. Further, as described in the specification of Japanese Patent Application Laid-Open No. 2000-32250, a technique for creating an album in analog fashion using IX information, which has been recorded on film for an Advanced Photo System, is available. However, a technique for creating an album in digital fashion does not exist at the present time.

SUMMARY OF THE INVENTION

Accordingly, an object of the present invention is to solve the aforementioned problems individually or collectively by generating a cover image using metadata that has been associated with digital images.

According to the present invention, the foregoing object is attained by providing an image processing method of generating a cover image to be attached to an output object that includes a digital image, comprising the steps of:

reading in metadata that has been associated with a digital image to be output; and generating the cover image by making selective use of a cover template associated with the metadata that has been read in.

Another object of the present invention is to reduce the amount of printing agent (colorant) used in a printer.

According to the present invention, the foregoing object is attained by providing further comprising the step of detecting remaining amount of printing material in a printer and selecting the cover template in accordance with the remaining amount of printing material detected.

A further object of the present invention is to prevent complete depletion of printing agent (colorant) in a printer.

According to the present invention, the foregoing object is attained by providing the cover template is selected so as to prevent total consumption of the printing material.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the structure of an image processing apparatus according to an embodiment of the present invention;

FIG. 8 is a diagram showing an example of a created cover;

DETAILED DESCRIPTION OF THE PREFERRED EMBODIMENTS

An image processing apparatus according to preferred embodiments of the present invention will now be described in detail with reference to the drawings.

[Structure]

FIG. 1 is a block diagram illustrating the structure of an image processing apparatus according to an embodiment of the present invention.

An input unit 101 is for inputting data based upon an indication from a user. An example is a keyboard or a pointing device such as a mouse. An output unit 102 outputs data to be printed by a printer or the like. A storage unit 103 is a device for storing image data and metadata, etc., and usually employs a hard disk or the like.

Using a RAM 106 as a working memory, a CPU 104 controls the above-mentioned components based upon a program that has been stored in a ROM 105. A control program necessary for processing, which will be described below with reference to a flowchart, has been stored in the storage unit 103 or ROM 105. The control program stored in the storage unit 103 is executed after it is read into the RAM 106 temporarily.

Though the image processing apparatus has various components in addition to those mentioned above, they are not central to the embodiments and are not described here.

[Album]

Figure 2A:
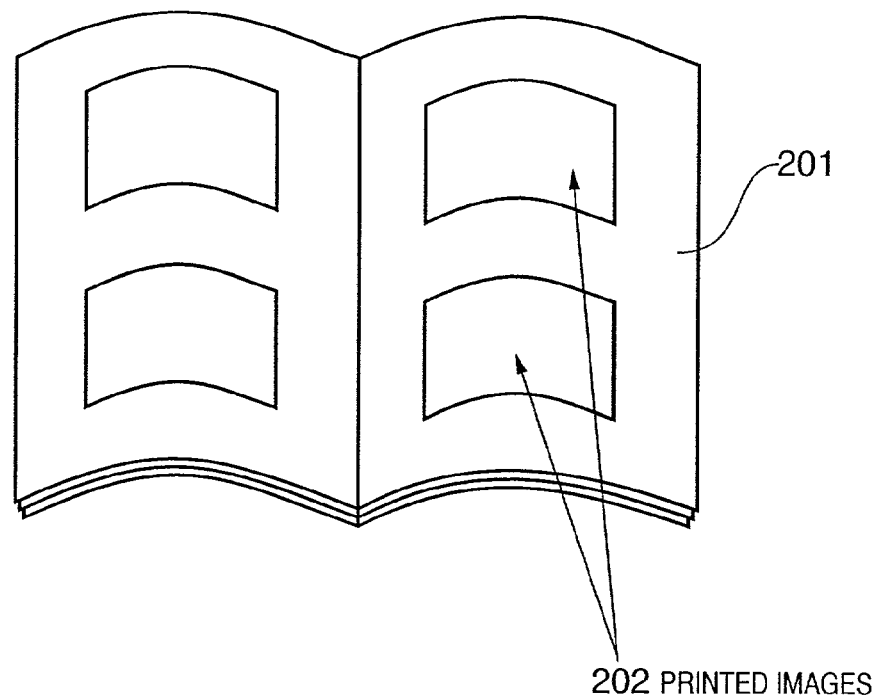
FIGS. 2A and 2B are diagrams useful in describing an album in which digital images are printed.
Figure 2B:
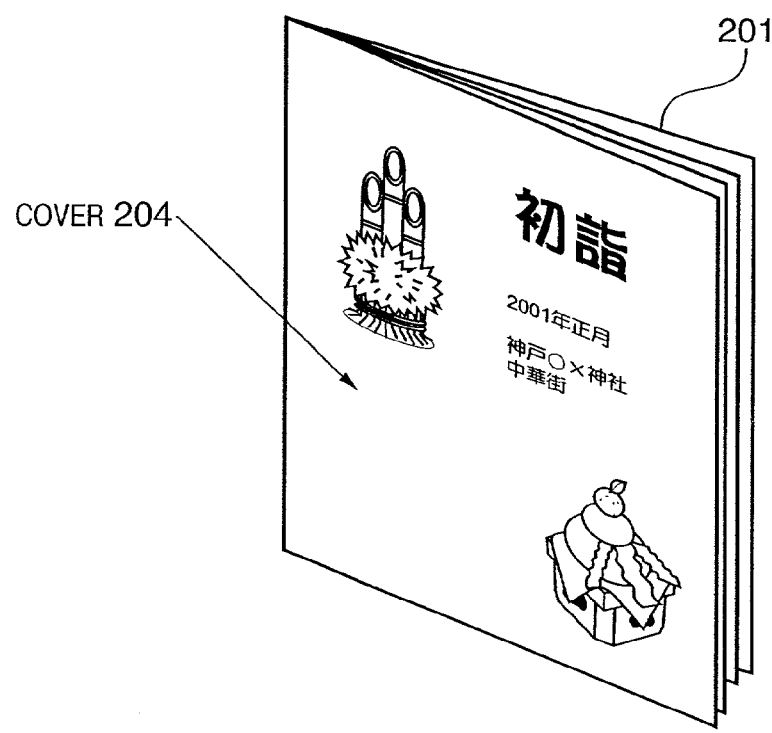

FIGS. 2A and 2B are diagrams useful in describing an album in which digital images are printed.

An album 201 is obtained by stacking a plurality of sheets of paper on which digital images have been printed. A cover 204 has been attached to the album 201, as shown in FIG. 2B illustrating the album 201 in the closed state. The title of the album, the location of photography and the date, etc., are written on the cover 204. Graphics and patterns relating to the title also are printed on the cover 204.

In addition to the album described above, there are also albums that are merely viewed on a display without being printed, and albums that have been converted to an HTML format so that they can be viewed using a Web browser.

A method of creating the cover of album 201 will now be described in detail.

FIRST EMBODIMENT

[Album Creation Method]

An instance where a group of images desired to be included in an album is placed in a single folder will be described as a first embodiment of the invention.

Figure 3:
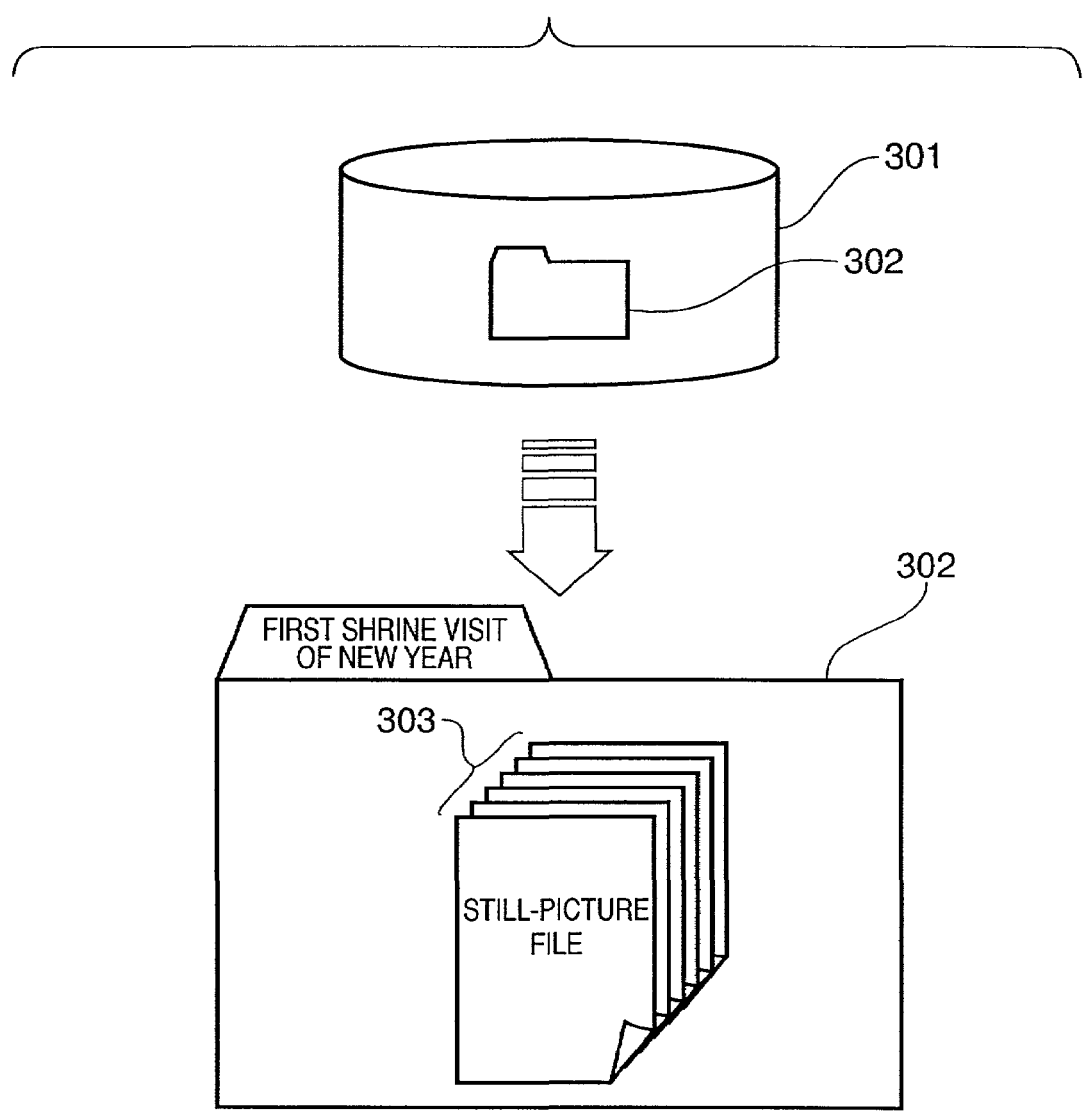
FIG. 3 is a diagram showing the manner in which a group of images desired to be included in an album is placed in a single folder.

Images that have been captured by a digital camera or the like usually are grouped in a folder on a per-event basis. For example, as shown in FIG. 3, if a folder 302 having the name "FIRST SHRINE VISIT OF NEW YEAR" exists in a storage unit 301, it is assumed that a group 303 of still-image files captured at the event "FIRST SHRINE VISIT OF NEW YEAR" has been placed in the folder 302.

Figure 4:
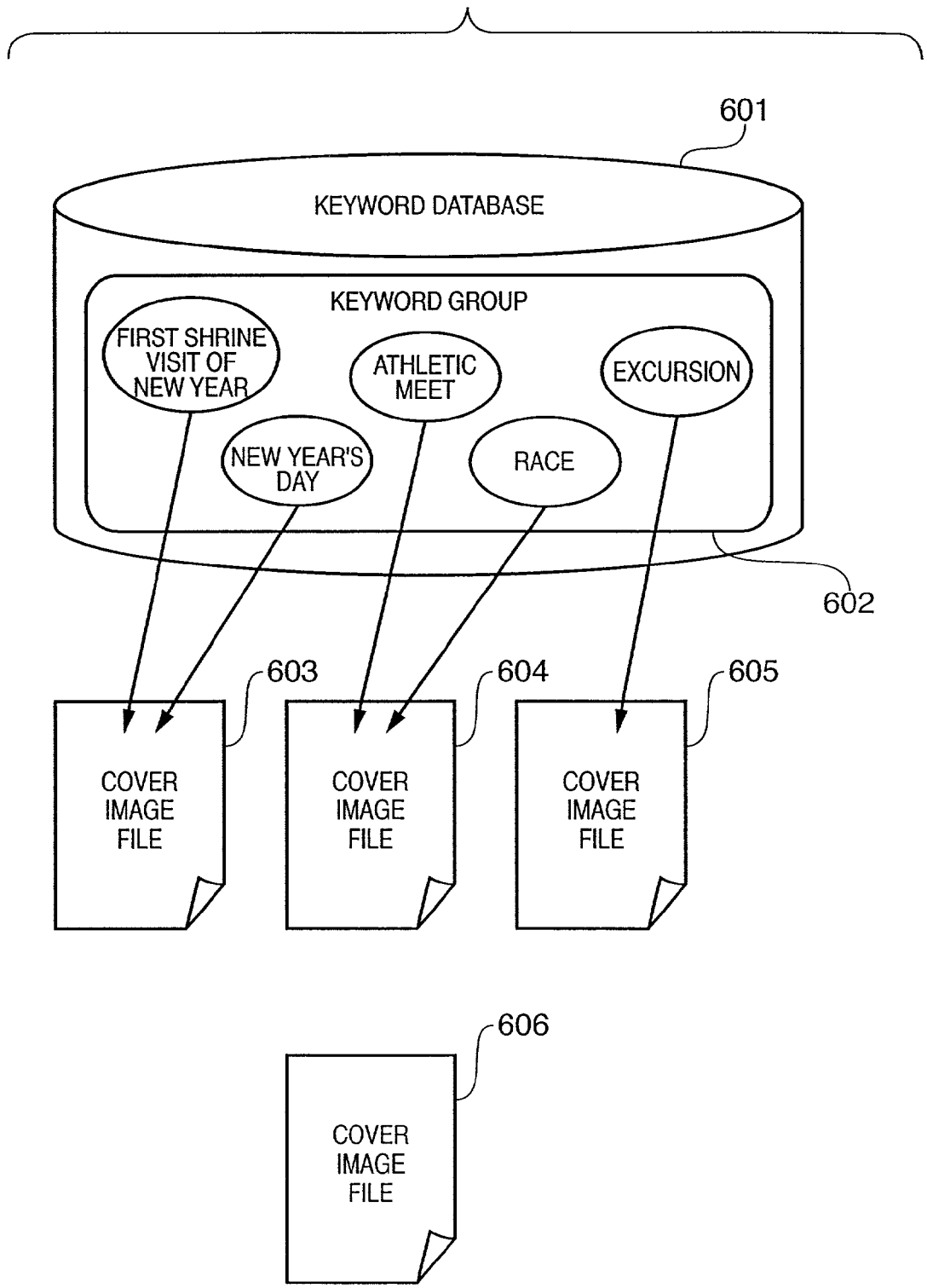
FIG. 4 is a diagram useful in describing a keyword database used when a cover is created.

FIG. 4 is a diagram useful in describing a keyword database 601 used when a cover is created The keyword database 601 stores a keyword group 602 and link destinations of the keywords. The keywords are linked to cover image files 603 to 605, which are templates for creating covers. If graphics and patterns, etc. are prepared in the cover image files 603 to 605 and text information such as titles is added thereto, then cover images can be constructed. A cover image file 606 is an image file that is not linked to any keyword in the keyword database 601, and therefore this file can be applied universally to any album. It should be noted that not only may an image file be used as a template. For example, a graphics markup language may be used in a file. Furthermore, the keyword database 601 and cover image files 603 to 606 have been stored in the storage unit 301 or the like.

Figure 5:
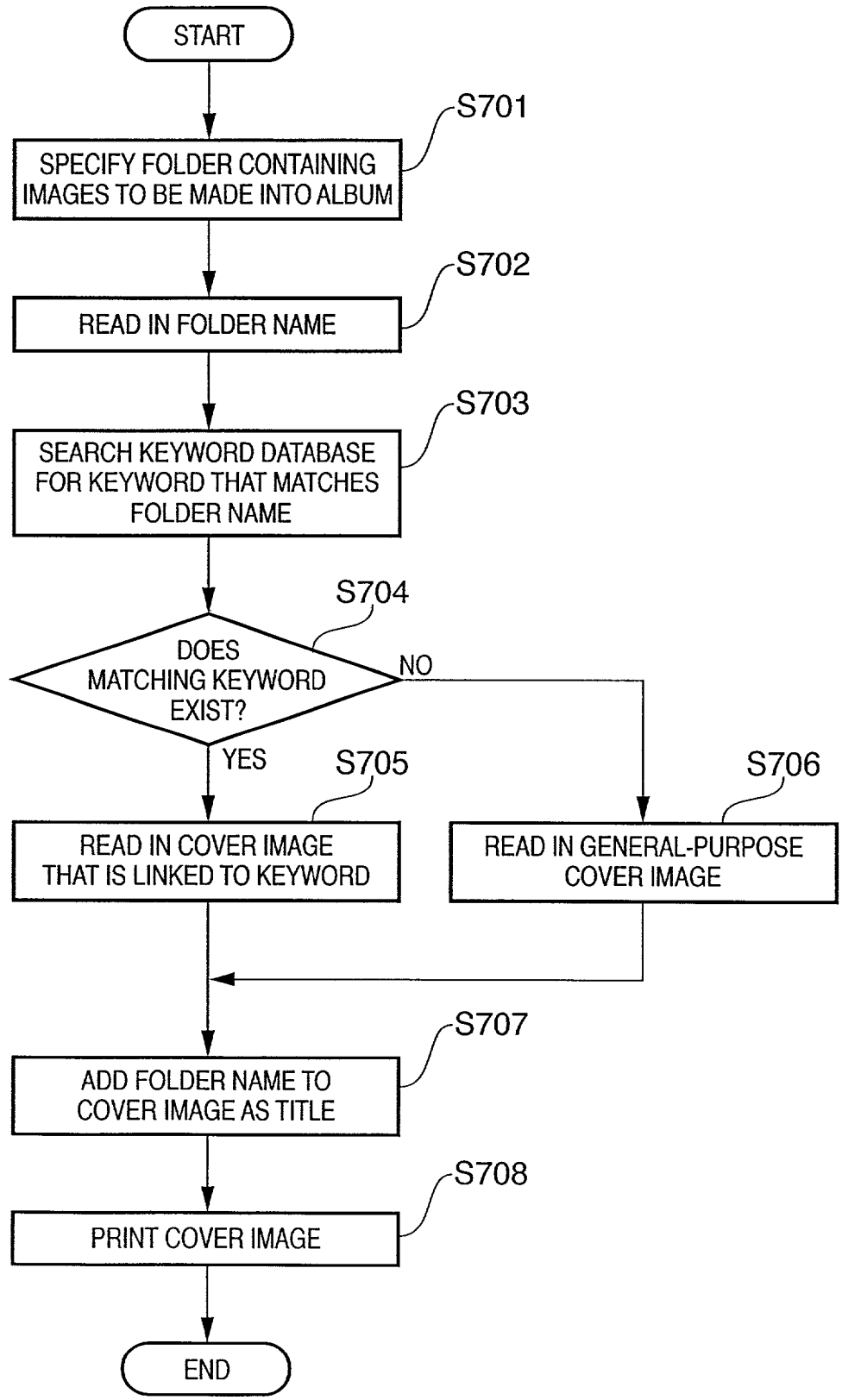
FIG. 5 is a flowchart useful in describing a procedure for creating a cover.

FIG. 5 is a flowchart useful in describing a procedure for creating a cover. The flowchart illustrates processing executed by the CPU 104 in accordance with indications from the user.

When the user operates the input unit 101 to specify a folder storing a group of images to be made into an album (S701), the CPU 104 reads in the name of the specified folder (S702) and searches the keyword database 601 for a keyword that matches the folder name (S703). If a decision rendered at step S704 is that a keyword matching the folder name exists, then control proceeds to step S705. If a matching keyword does not exist, then control proceeds to step S706.

If a keyword that matches the folder name is found, the CPU 104 reads in a cover image file that has been linked to this keyword. On the other hand, if a keyword matching the folder name does not exist, the CPU 104 reads in the general-purpose cover image file 606. The CPU 104 adds on the folder name as a title to the image of the cover image file that has been read in (S707) and causes the created cover image to be printed (S708).

SECOND EMBODIMENT

A method of creating a cover utilizing metadata will now be described as a second embodiment. In the case of the second embodiment, the metadata is data in which information relating to an image is described. The information includes mainly the name of the photographer, the date of photography, the location of photography and the event.

Figure 6:
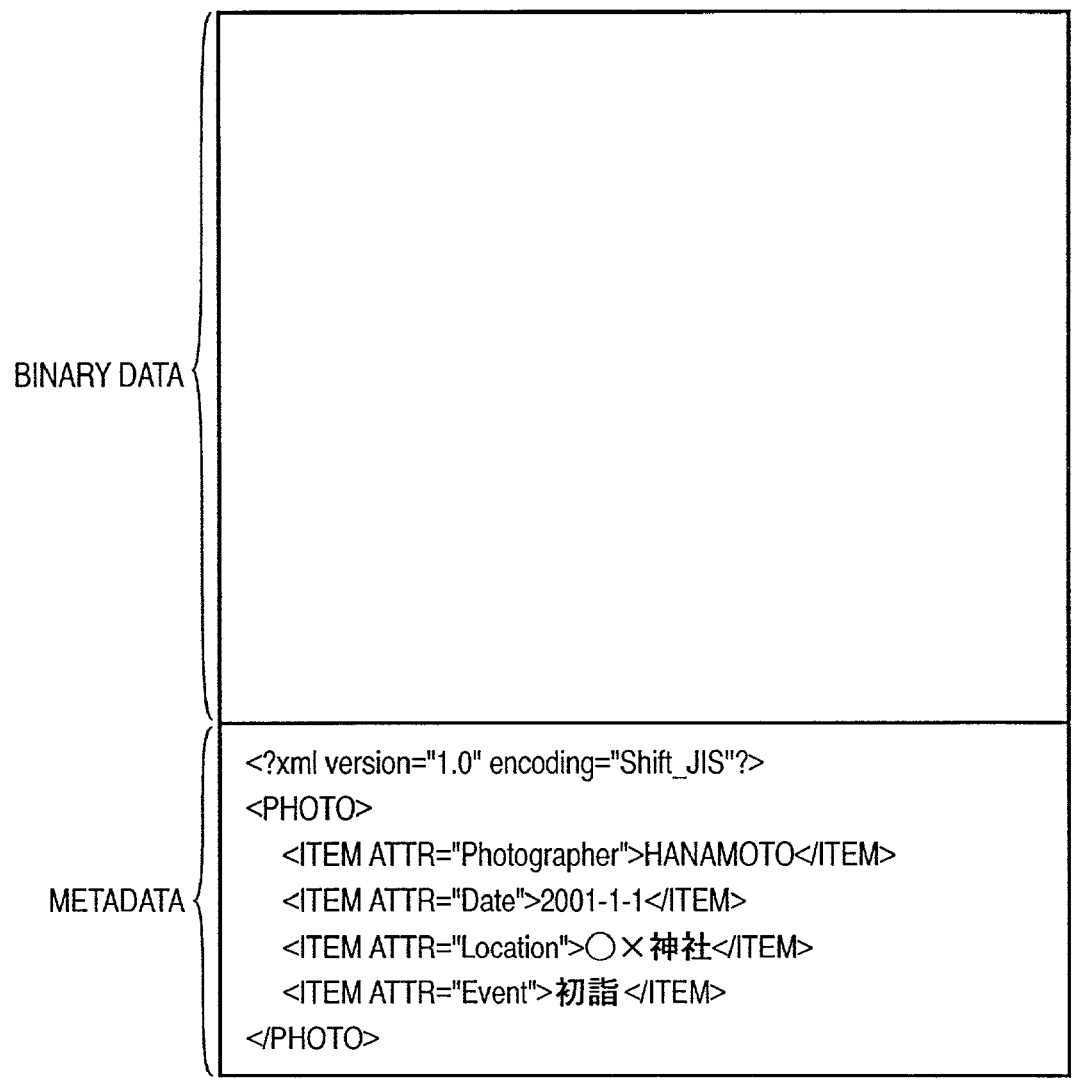
FIG. 6 is a diagram showing the manner in which metadata is added onto binary data.

FIG. 6 is a diagram showing the manner in which metadata is added onto binary data such as image or voice data. As shown in FIG. 6, it is possible to add on metadata, which is written in XML (extensible Markup Language), to the end of the binary data. In addition, metadata and binary data existing as separate files may be linked, and the link destination of metadata may be a plurality of binary files. Further, a case in which metadata is marked up in the header of binary data also is conceivable. It should be noted that the data markup language is not limited to XML. Other languages that can be used are HTML (HyperText Markup Language) and SGML (Standard Generalized Markup Language).

Figure 7:
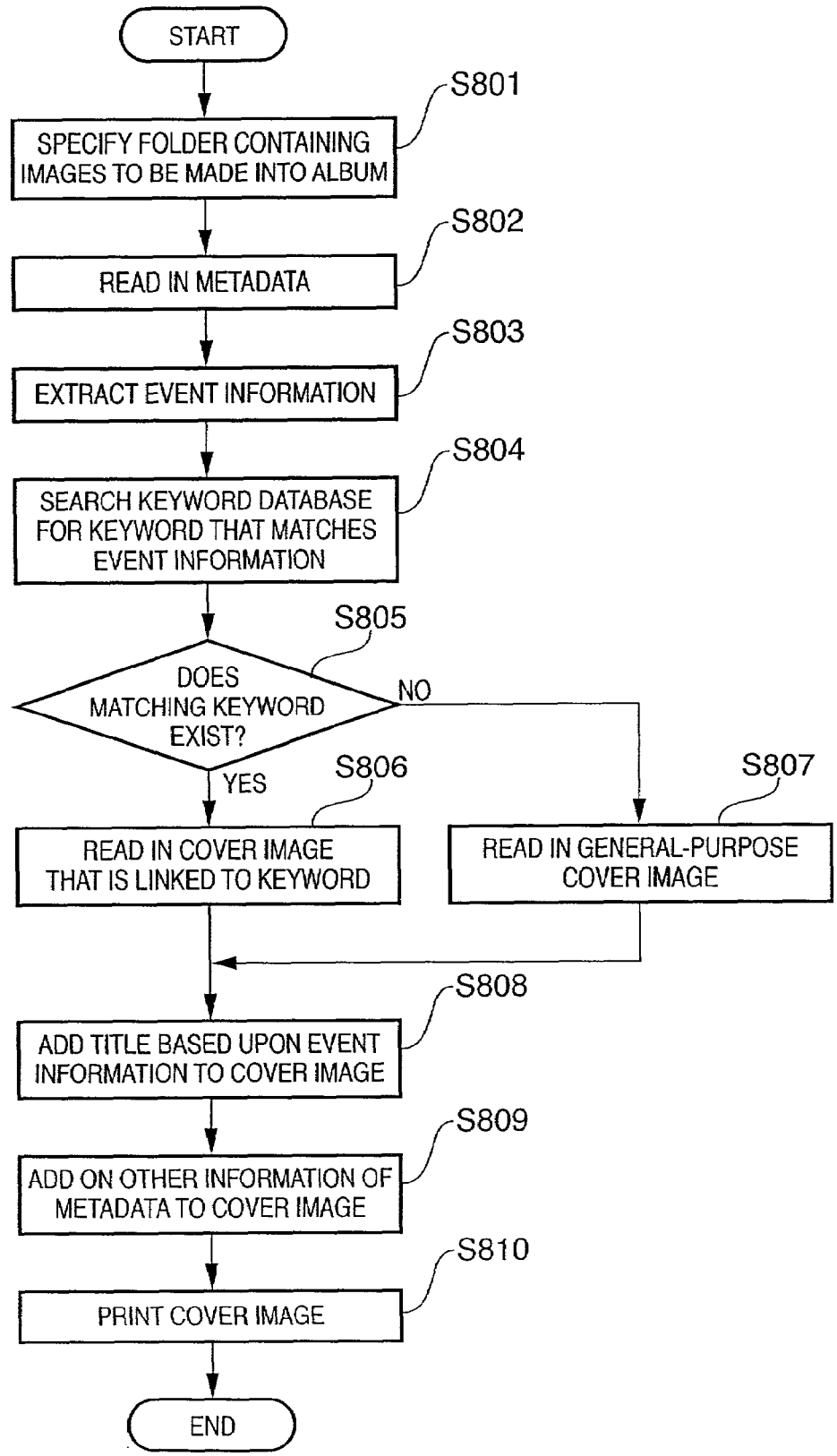
FIG. 7 is a flowchart useful in describing a procedure for creating a cover using metadata.

FIG. 7 is a flowchart useful in describing a procedure for creating a cover using metadata. This is processing executed by the CPU 104 in accordance with an indication from the user. It should be noted that a group of images to be made into a folder is placed in a single folder in the manner described above, and it is assumed that metadata of the kind shown in FIG. 6 has been added onto the data of each image. Further, it is assumed that all of the images in one folder have been captured at the same event.

When the user operates the input unit 101 to specify a folder containing a group of images to be made into an album (S801), the CPU 104 reads in the metadata of the image-file group that has been placed in the specified folder (S802), reads event information from the metadata (S803) and searches the keyword database 601 for a keyword that matches the event information (S804). If a decision rendered at step S805 is that a keyword matching the event information exists, then control proceeds to step S806. If a matching keyword does not exist, then control proceeds to step S807.

If a keyword that matches the event information is found, the CPU 104 reads in a cover image file that has been linked to this keyword. On the other hand, if a keyword matching the event information does not exist, the CPU 104 reads in the general-purpose cover image file 606. The CPU 104 adds on a title, which is based upon the event information, to the image of the cover image file that has been read in (S808). Of course, the folder name rather than the event information may be used as the title.

Next, the CPU 104 reads information other than the event information, e.g., the name of the photographer and the date of photography, etc., from the metadata, adds this data onto the image of the cover image file and causes the created cover image to be printed (S810).

FIG. 8 is a diagram showing an example of the cover 204 thus created. The information described in metadata file 501 is reflected in the cover 204. If the content of metadata differs for each file, some or all of this information may be placed on the cover.

THIRD EMBODIMENT

A method of creating an album cover utilizing metadata of a plurality of images will now be described as a third embodiment. In the first and second embodiments, a cover is created using the name of a folder of a group of images and event information that is common for a group of images. However, a cover may be created by using metadata of each individual image contained in a group of images.

Figure 9:
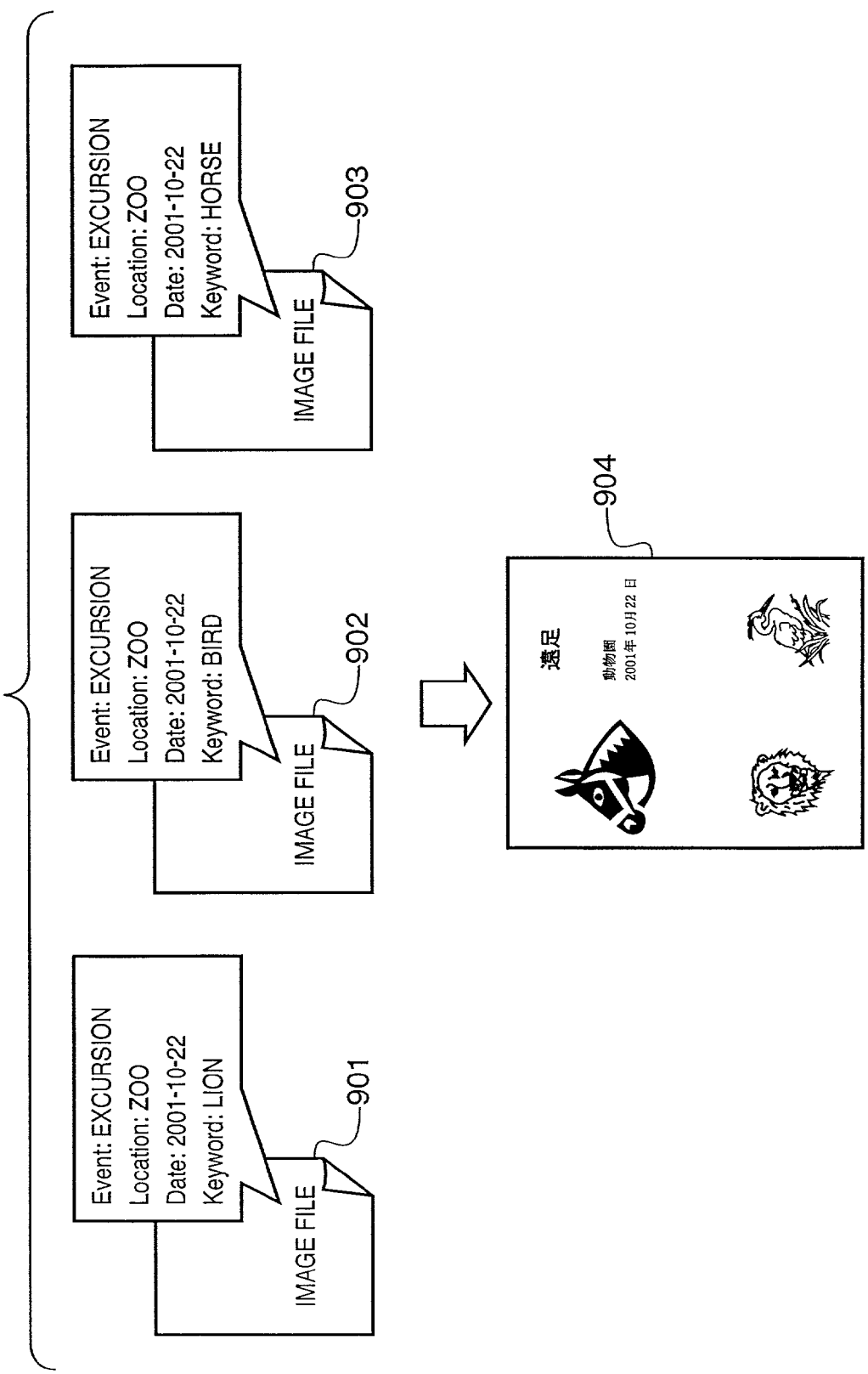
FIG. 9 is a diagram showing an example of image files and a cover.

FIG. 9 is a diagram showing an example of image files and a cover. Event information (Event), location information (Location) and date information (Date), which are common items of information, and image-specific keywords have been registered as metadata in image files 901 to 903 shown in FIG. 9.

The keywords of respective ones of the image files 901 to 903 are reflected in the cover as clip art. The result is a cover 904 depicted in FIG. 9.

Figure 10:
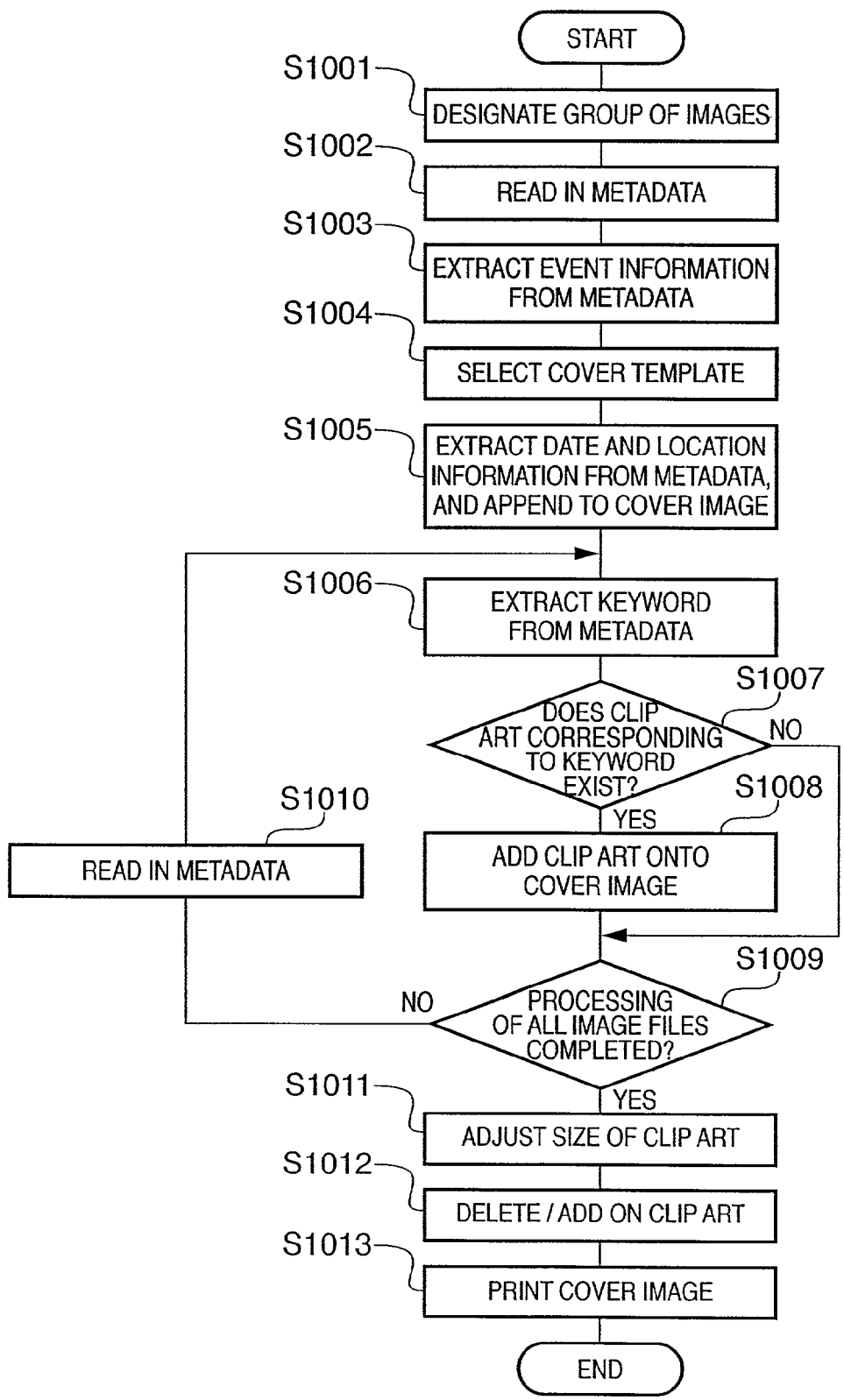
FIG. 10 is a flowchart useful in describing a procedure for creating an album cover using a keyword specific to an image file.

FIG. 10 is a flowchart useful in describing a procedure for creating an album cover using a keyword specific to each image file. This is processing executed by the CPU 104 in accordance with an indication from the user.

When the user operates the input unit 101 to specify a folder containing a group of images to be made into an album (S1001), the CPU 104 reads in the metadata of one image file that has been placed in the specified folder (S1002) and extracts the event information from the metadata (S1003). A cover template is selected based upon the event information extracted (S1004). The selection of the cover template has already been described in connection with the first and second embodiments and the details thereof need not be described again here.

Next, the CPU 104 extracts date information and location information from the metadata that has been read in and appends this information to the cover image 904 (S1005), extracts keyword information from the metadata that has been read in (S1006) and determines whether clip art corresponding to the keyword has been stored in the storage unit 103 or ROM 105 (S1007). If clip art corresponding to the keyword exists, then the CPU 104 adds this clip art onto the cover image 904 (S1008). More specifically, if the keyword is "LION", the CPU 104 determines whether there is clip art corresponding to "LION". If clip art corresponding to "LION" exists, then the CPU 104 adds this clip art onto the cover image 904. If clip art corresponding to the keyword does not exist, this is reported to the user and the user is allowed to select whether to add on clip art or to ignore the keyword. The details, however, are not shown.

Next, the CPU 104 determines whether the operation of investigating whether or not clip art corresponding to a keyword exists and adding clip art onto the cover image has been completed for all image files of the designated image group (S1009). If this operation has not been completed, then the CPU 104 reads in the metadata of the next image file (S1010), after which control returns to step S1006. If the operation has been completed, the size of the clip art is adjusted as needed (S1011), as when a large number of clip-art items have been added to the cover image 904. All items of clip art can be placed on the cover image 904 through this operation.

Next, the user is allowed to delete unnecessary clip art or to add on required clip art (S1012), after which the cover image 904 is printed (S1013).

Thus, a cover can be created taking into consideration the metadata of all of the images in the group.

FOURTH EMBODIMENT

A method of printing an album cover suited to a printing environment in which a cover is created will now be described as a fourth embodiment.

When an album is printed using an ink-jet printer or the like, there is a high probability that the ink will be run out because a large quantity of ink is expended. In other words, if the amount of ink remaining is small, using as little of the remaining ink as possible for printing is sensible.

Figure 11:
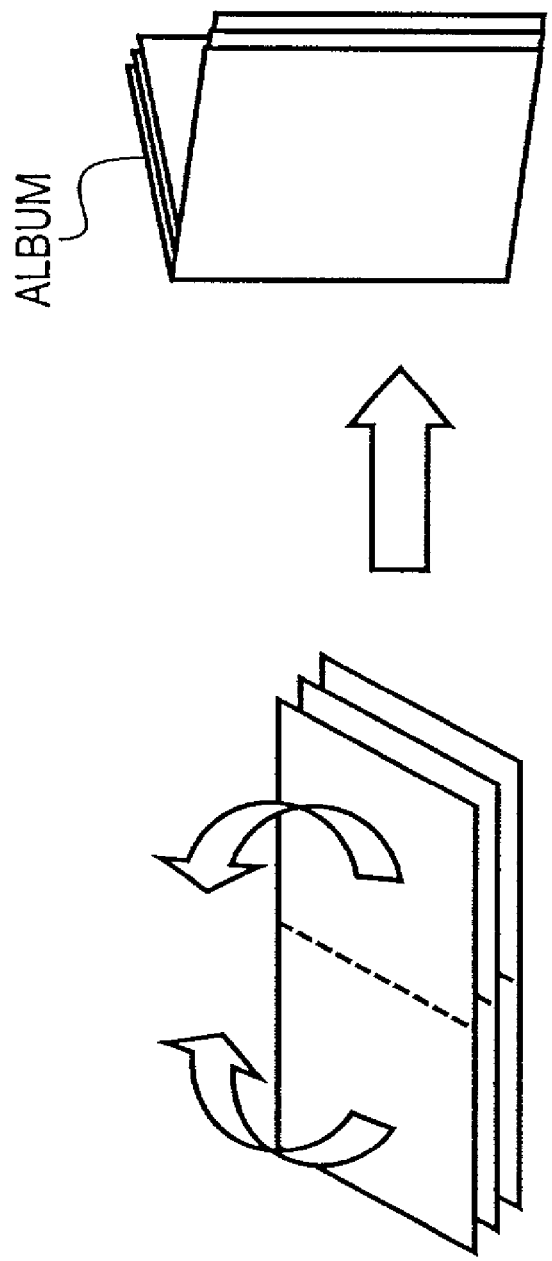
FIG. 11 is a diagram useful in describing a case where sheets of printing paper on which photographs have been printed are folded to produce an album.
Figure 12:
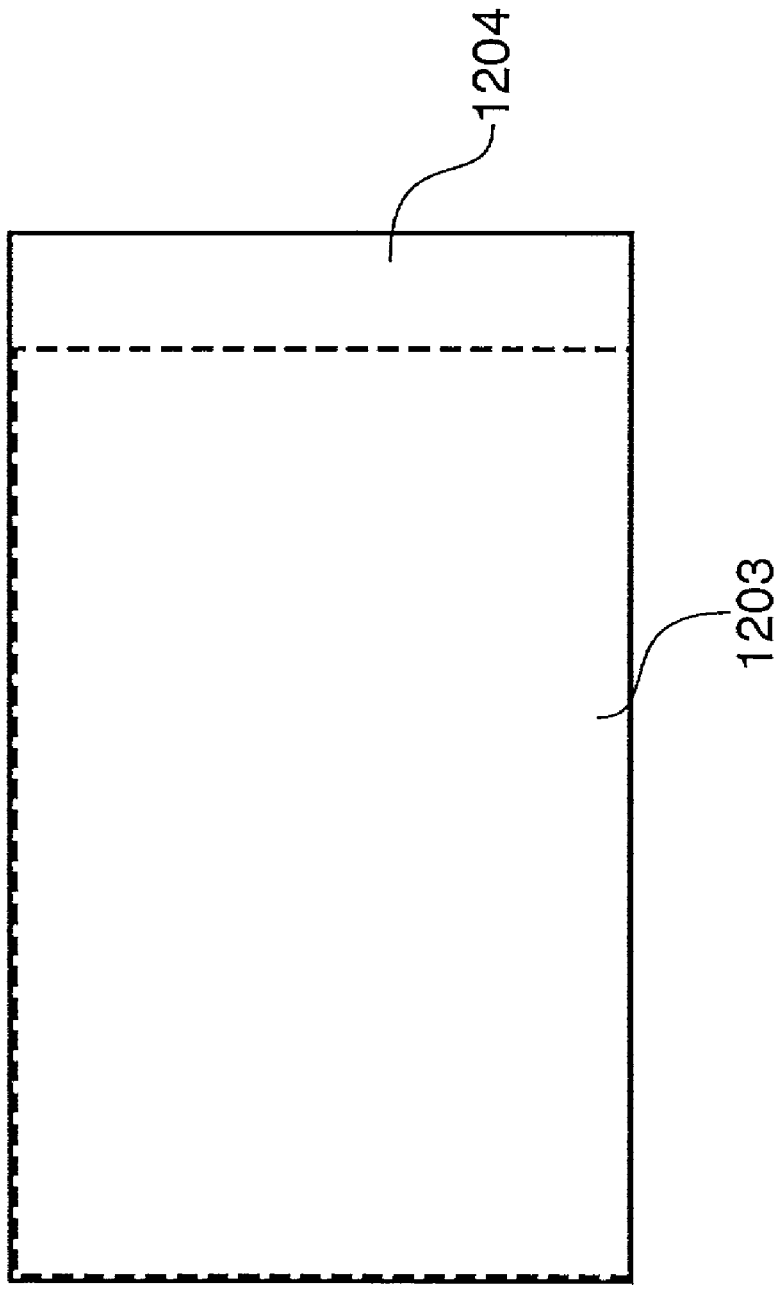
FIG. 12 is a diagram useful in describing the size of a cover.

Further, in a case where sheets of printing paper on which photographs have been printed are folded to produce an album, as shown in FIG. 11, the inner sheets of paper may protrude beyond the edges of the album owing to the thickness of the paper. In such case it is necessary that the paper width of the cover, which is placed on the outermost side of the album, be made somewhat larger than that of the other sheets of paper. More specifically, as shown in FIG. 12, the width of a sheet of printing paper 1204 for the cover should be made larger than that of a sheet of printing paper 1203 for photographs.

Figure 13:
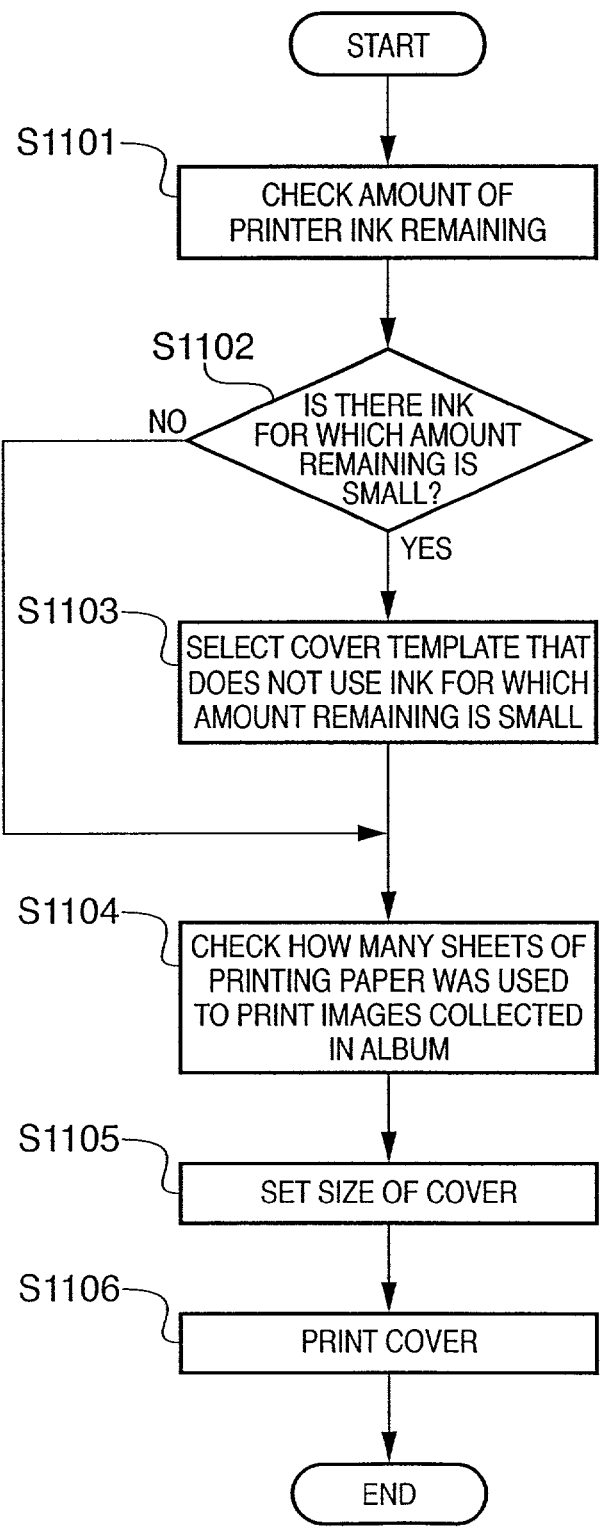
FIG. 13 is a flowchart for describing a method of creating a cover that takes amount of remaining ink and number of album pages into account.

FIG. 13 is a flowchart for describing a method of creating a cover that takes amount of remaining ink and number of album pages into account. This is processing executed by the CPU 104.

First, utilizing a printer driver, the CPU 104 investigates the amount of ink remaining on a per-ink basis (S1101) and detects an ink for which the amount remaining is small (S1102). If there is no ink for which the remaining amount is small, control proceeds to step S1104. However, if an ink for which the amount remaining is small is detected, the CPU 104 selects a cover template that does not use the ink for which the amount remaining is small (S1103). For example, if the amount of magenta ink remaining is small, the CPU 104 selects a cover template that is based upon the color green, which uses as little magenta as possible.

Next, the CPU 104 checks to see how many sheets of paper was used when a series of album photos is printed (S1104), sets the width of the cover in accordance with the number of sheets of paper (S1105) and then prints the cover (S1106).

The larger the number of sheets of printing paper on which photos to be included in the album are printed, the greater the width of the cover is made to expand the width of a spine of the album.

For example, if the printing paper for the photos to be included in the album is size A4, the cover is printed on printing paper of size B4. However, when printing is performed, a cutting line indicating the size of the cover is printed on the sheet of printing paper for the cover. If the user cuts the cover along the cutting line that has been printed on the cover, the album cover will have the appropriate size.

In accordance with the embodiments described above, an album cover can be created in simple fashion using the name of a folder, in which a group of images has been placed, and metadata. Furthermore, since the content of the metadata is added to the cover, organizing the album is simplified.

Further, the handling of images is not limited to the images of a group placed in the same folder. If an event is the same, then groups of images placed in a plurality of folders can also be handled. Furthermore, utilization of a keyword database does not impose a limitation. If use is made of templates to which keywords have been attached, then it is permissible to perform a comparison between keywords and metadata.

Further, an album is not limited to prints. Forms of output that do not entail printing include presenting the album on a display for viewing and uploading the album to a website upon converting it to an HTML file.

The example described above is such that when printing agents of a plurality of colors are used, a template is selected so as to prevent the total consumption of a printing agent of at least one color. However, the above-described technique can be applied also in a case where a printing agent of only one color is used. For example, if it has been detected that the amount of a printing agent of the color black is small, it will suffice to select a template in which printing is performed with as little coloration as possible, thereby preventing total consumption of the printing agent (colorant).

Note that this invention can be applied to the above inkjet printer and a printer which uses color toner as the printing material.

Further, not only selection of a template but also a method that selects image size is effective. Specifically, it may be so arranged that the amount of printing agent (colorant) used is curtailed by reducing image size. Furthermore, if image size is adjusted in accordance with the number of prints, i.e., if image size is reduced in a case where a large number of covers are printed, the amount of colorant used can be reduced. This makes it possible to prevent total consumption of the colorant.

As many apparently widely different embodiments of the present invention can be made without departing from the spirit and scope thereof, it is to be understood that the invention is not limited to the specific embodiments thereof except as defined in the appended claims.

What is claimed is:

1. A method of generating a cover image to be attached to an output object that includes digital images, comprising the steps of:
    specifying a folder which contains digital images to be outputted as the output object;
    reading in information for the specified folder; and
    generating the cover image onto which the information for the specified folder is added as a title.

2. The method according to claim 1, further comprising the step of selecting a template used in the generating step to generate the cover image in accordance with the information of the specified folder.

3. The method according to claim 2, wherein the template includes graphics corresponding to information extracted from the information of the specified folder.

4. The method according to claim 2, further comprising the step of detecting a remaining amount of printing material in a printer and selecting the template in accordance with the remaining amount of printing material detected.

5. The method according to claim 4, wherein when the printer has printing materials of a plurality of colors, the template is selected so as to prevent total consumption of a printing material of at least one color.

6. The method according to claim 1, wherein the information read in the reading step is a folder name of the specified folder.

7. An image processing apparatus for generating a cover image to be attached to an output object that includes digital images, comprising:
    a specifying section, arranged to specify a folder which contains digital images to be outputted as the output object;
    a reader, arranged to read in information for the specified folder; and
    a generator, arranged to generate the cover image onto which the information for the specified folder is added as a title.

8. The apparatus according to claim 7, further comprising a selector arranged to select a template used by said generator to generate the cover image in accordance with the information of the specified folder.

9. The apparatus according to claim 8, wherein the template includes graphics corresponding to information extracted from the information of the specified folder.

10. The apparatus according to claim 7, wherein the information read by said reader is a folder name of the specified folder.

11. A computer-executable program product stored on a computer-readable medium comprising program code causing a computer to perform a method of generating a cover image to be attached to an output object that includes digital images, the method comprising the steps of:
    specifying a folder which contains digital images to be outputted as the output object;
    reading in information for a the specified folder; and
    generating the cover image onto which the information for the specified folder is added as a title.

* * * * *